M. P. OSBOURN.
VALVE FOR HEATING APPARATUS.
APPLICATION FILED MAY 5, 1908.
934,932.
Patented Sept. 21, 1909.
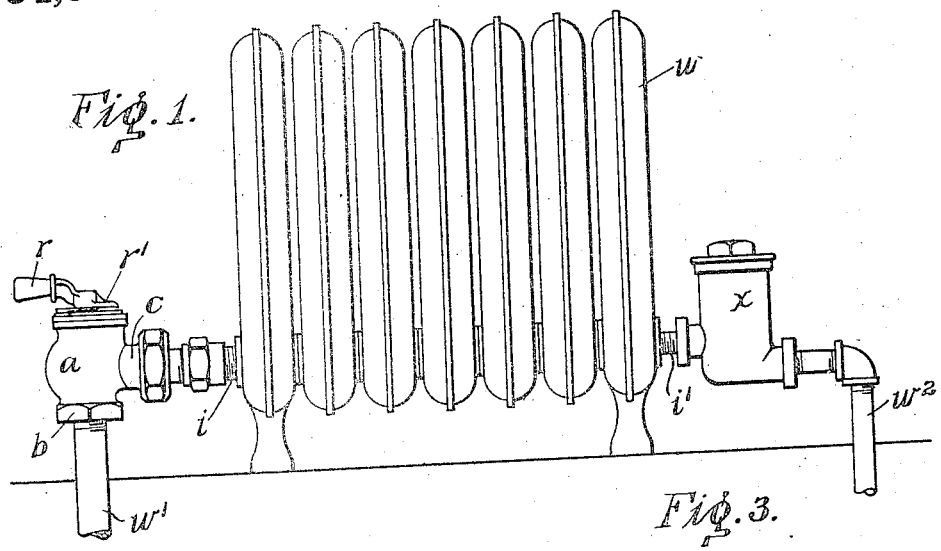
Fig. 1.
Fig. 3.
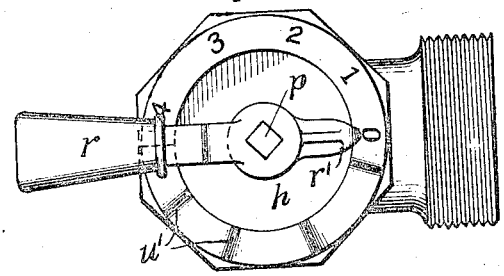
Fig. 2.
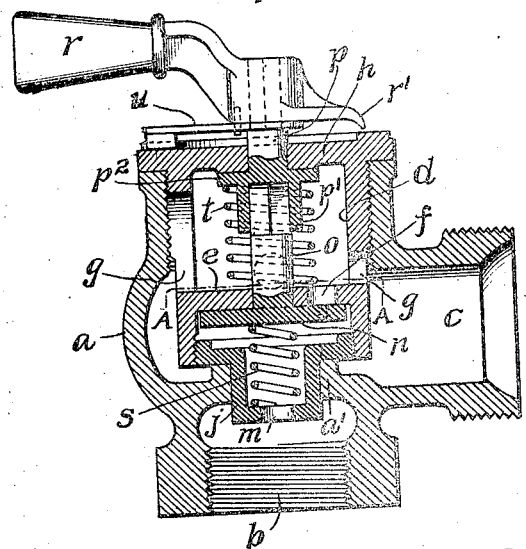
Fig. 4.
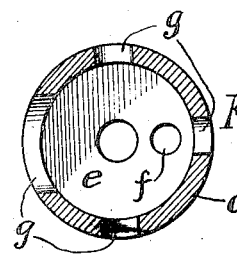
Fig. 5.
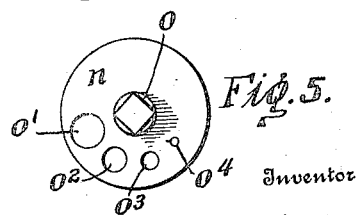
Fig. 6.
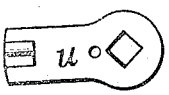
Witnesses
Daniel Webster Jr.
R. M. Kelly
Inventor
Millard P. Osbourn
By
Attorney

UNITED STATES PATENT OFFICE.

MILLARD P. OSBOURN, OF MERCHANTVILLE, NEW JERSEY, ASSIGNOR TO WARREN WEBSTER & COMPANY, A CORPORATION OF NEW JERSEY.

VALVE FOR HEATING APPARATUS.

934,932.

Specification of Letters Patent. Patented Sept. 21, 1909.

Application filed May 5, 1908. Serial No. 430,924.

*To all whom it may concern:*

Be it known that I, MILLARD P. OSBOURN, a citizen of the United States, residing at Merchantville, in the county of Camden and State of New Jersey, have invented an Improvement in Valves for Heating Apparatus, of which the following is a specification.

My invention relates to valves which are provided with a plurality of ports or passageways of different sizes and may be operated to open any desired port to provide a thoroughfare of variable but determinate size.

My valve is particularly adapted for use to control the flow of steam into a radiator or heater so that exactly the desired opening or inlet may be provided.

More particularly it is the object of my invention to provide a valve of this general character which shall be simple in construction and easy to operate, and which shall not be subject to leakage. Where nice adjustment of the inlet is desired, as, for example, in those systems of steam heating where a modulation of temperature is obtained by the regulation of the inlet valve, it is essential that leakage of steam through the valve body around or outside of the opened port should be prevented, and this result is accomplished by the present improvements.

In the drawings Figure 1 is a side elevation of a steam radiator and its connections illustrating the application of my valve; Fig. 2 is a vertical sectional view of the valve; Fig. 3 is a plan view; Fig. 4 is a horizontal section of the valve-cage taken in the line A—A of Fig. 2; Fig. 5 is a plan view of the detached valve plate; and Fig. 6 is a plan view of the pointer arresting spring which may be used.

$a$ is a suitable valve-body having an inlet $b$ and outlet $c$ adapted for connection in the system.

$d$ is a cage which is inserted in the valve-body and carries a horizontal partition or diaphragm $e$ which forms the true dividing wall between the inlet and outlet and contains an opening $f$ which constitutes the valve controlled thoroughfare or passageway. The construction of the cage shown in the drawings is one adapted for the utilization of a well known form of valve-body. The cage has a closed top $h$ and is screwed into the open top of the body. The side walls of the cage above the diaphragm $e$ have suitable openings $g$, through which the steam after passing the opening $f$ may enter the valve-body and pass through the valve outlet to the radiator inlet $i$.

$j$ is a thimble, screwed into the lower rim of the cage, below the diaphragm $e$ which fits the seat opening $a'$ of the valve-body, and is provided with an opening $m$ through which the steam passes from the valve inlet to the opening $f$.

$n$ is the movable valve-piece which consists of a flat plate arranged in contact with the diaphragm $e$; it is rotatable, and is provided with a plurality of openings $o'$, $o^2$, $o^3$, $o^4$, differing in size and arranged so that any one may be brought into register with the large opening $f$ in the diaphragm $e$. As shown the plate $n$ is arranged below the diaphragm $e$ and carries a central post $o$ by means of which it is rotated. This post extends up through the diaphragm, and is operatively connected with a rotary stud $p$ extending through the top $h$ and operated by the handle $r$. A spring $s$ between the valve plate $n$ and the thimble $j$ of the cage maintains the plate in contact with the diaphragm $e$. The pressure of the entering steam on the lower face of the plate $n$ also forces its face against the diaphragm; and thus leakage is prevented and only so much steam enters the valve-body as passes through the opening in the series $o'$ &c. which is in register with the opening $f$.

In the construction shown, the end of the post $o$ is squared and fits a complementary socket $p'$ on the stud $p$. A spring $t$ between the diaphragm $e$ and this socket $p'$ maintains the socket flange $p^2$ in contact with the inner face of the cage top $h$ and prevents leakage. The operating handle $r$ may be provided with a pointer $r'$ to indicate by numerals or suitable marks on the top of the valve, the extent of movement of the valve plate $n$ and which of the openings $o'$, $o^2$, &c. is in register with the opening $f$. By means of this handle the plate $n$ may be turned to shut the valve by closing the opening $f$ or to open the valve to the extent desired by bringing the proper opening in the series $o'$, $o^2$, &c. in register with the opening $f$.

$u$ is a spring carried by the handle $r$ and adapted to engage notches $u'$ on the top of the valve-body arranged to determine the proper positions of the handle when the respective openings $o'$, $o^2$ &c. are in register with the opening $f$ and thus to prevent the partial opening of said openings $o'$, $o^2$ &c.

In Fig. 1 the valve is shown applied to the steam inlet $i$ of a radiator $w$ and receiving steam from the steam supply pipe $w'$. The quantity of steam admitted to the radiator is controlled by the movement of the valve plate $n$ by the handle $r$ to open one of the ports $o'$, $o^2$ &c.. The discharge outlet $i'$ is shown provided with a valve $x$ (which is preferably automatic) discharging to the return pipe $w^2$. A particular advantage of this construction is that leakage of steam through the valve is prevented; the quantity of steam admitted to the radiator is controlled absolutely by the size of the port of the series $o'$, $o^2$, &c. which is opened, and is not augmented by steam admitted by leakage. The pressure of the steam acting, in addition to the spring $s$, on the plate $n$ maintains it in steam tight contact with the diaphragm $e$, and takes up the ordinary wear resulting from the movement of the plate.

In the construction shown the distance between adjacent openings $o'$, $o^2$, &c. is less than the diameter of the opening $f$. From this it results that before any opening in the plate $n$ passes wholly from under the opening $f$, the next opening in the series in said plate will be brought into partial register with said opening. This enables the size of the thoroughfare to be graduated between the limits afforded by the diameter of the openings $o'$, $o^2$, &c. and prevents the total closing of the opening $f$ or its reduction to an undesirable minimum in intermediate position while the plate $n$ is being turned. The flange $p^2$ maintained by the action of the spring $t$ in contact with top of the valve $h$ prevents the leakage of steam without requiring excessive tightness between the stud $p$ and its bearing. It will also be noted that with the particular construction of the cage shown, all of the parts are contained in and carried by it, and may be applied to a standard valve-body of the character shown, by simply removing the cap and the contained valve devices, and screwing in the cage. While this is a particular advantage in some cases, I do not mean to limit my invention to this particular construction. While the valve is particularly adapted as a supply valve to control the supply of steam to a radiator, it may be used for other purposes, e. g., as a return valve to control the escape of air and water of condensation from a radiator or heater.

What I claim is as follows:

1. In a valve of the character specified, the combination of a body having an inlet and an outlet, a cage in said body having a diaphragm provided with an opening forming the thoroughfare, a perforated thimble carried by said cage below the diaphragm and fitting the opening to the inlet of the body, a valve piece consisting of a rotary plate arranged in contact with said diaphragm on the lower side thereof and provided with a plurality of ports of different sizes any one of which may be brought in register with the opening in the diaphragm by turning the plate, an operating handle, and connections between the handle and valve-piece.

2. In a valve of the character specified, the combination of a body having an inlet and an outlet, a removable cage in said body fitting the valve seat and having a diaphragm provided with an opening forming the thoroughfare, a valve piece consisting of a rotary plate arranged in contact with said diaphragm on the lower side thereof and provided with a plurality of ports of different sizes any one of which may be brought in register with the opening in the diaphragm by turning the rotary plate, and a spring acting on said plate to maintain it in contact with said diaphragm.

3. In a valve of the character specified, the combination of a body having an inlet and an outlet, a cage in said body having a diaphragm provided with an opening forming the thoroughfare, a perforated thimble carried by said cage below said diaphragm, a valve piece consisting of a rotary plate arranged in contact with said diaphragm on the lower side thereof and provided with a plurality of ports of different sizes any one of which may be brought in register with the opening in the diaphragm by turning the rotary plate, and a spring between the thimble and plate acting on said plate to maintain it in contact with said diaphragm.

4. In a valve of the character specified, the combination of a body having an inlet and an outlet, a cage in said body fitting the opening to the inlet of the body and provided with a diaphragm having an opening forming the thoroughfare, a valve-piece consisting of a rotary plate arranged in contact with said diaphragm on the lower side thereof and provided with a plurality of ports of different sizes any one of which may be brought in register with the opening in the diaphragm by turning the rotary plate, and a spring acting to maintain said plate in contact with the diaphragm.

5. In a valve of the character specified, the combination of a body having an inlet and an outlet and provided with a diaphragm between the inlet and outlet having an opening forming the thoroughfare, a valve piece consisting of a rotary plate arranged in contact with said diaphragm on the lower side thereof and provided with a post extending through said diaphragm for the purpose of rotating the plate, said plate being provided with a plurality of ports of different sizes any one of which may be brought in register with the opening in the diaphragm by turning the rotary plate, a handle exterior to the valve body and connections within the valve body between said handle and post of the rotary plate having provision for vertical yielding movement of the valve-piece with respect to the handle.

6. In a valve of the character specified, the combination of a body having an inlet and an outlet and provided with a diaphragm between the inlet and outlet having an opening forming the thoroughfare, a valve piece consisting of a rotary plate arranged in contact with said diaphragm on the lower side thereof and provided with a post extending through said diaphragm for the purpose of rotating the plate, said plate being provided with a plurality of ports of different sizes any one of which may be brought in register with the opening in the diaphragm by turning the rotary plate, a rotary stud extending through the top of the valve body, and having a flange $p$ located inside of the valve body, said stud engaging the post of the rotary plate, and a spring acting on said stud and maintaining its flange in contact with the inner face of the top of the valve body.

7. The valve attachment for the purpose described consisting of a cage adapted to be inserted in the valve body having a portion adapted to fit the seat opening of such body and a diaphragm provided with an opening, a rotary plate arranged below the diaphragm and in contact with the lower face thereof and having a plurality of openings of different sizes any one of which may be brought in register with the opening in the diaphragm.

8. The valve attachment for the purpose described consisting of a hollow cage adapted to be inserted in the valve body having a portion adapted to fit the seat opening of such body, a closed top and a diaphragm provided with an opening, a rotary plate arranged below the diaphragm and in contact with the lower face thereof and having a plurality of openings of different sizes any one of which may be brought in register with the opening in the diaphragm, said plate having a post extending through the diaphragm, and means for rotating said plate operatively connected with said post and extending through the closed top of the cage.

9. The valve attachment for the purpose described consisting of the hollow cage $d$ having a perforated thimble $j$ adapted to fit the seat-opening, a closed top $h$, openings $g$ in its side walls and the diaphragm $e$ below the openings $g$, said diaphragm having the opening $f$, and the rotary valve plate $n$ arranged below the diaphragm $e$ and in contact therewith, and having the plurality of ports $o'$, $o^2$, &c. of different sizes adapted to register with the opening $f$ in the diaphragm when the plate is rotated.

10. The valve attachment for the purpose described consisting of the hollow cage $d$ having a closed top $h$, openings $g$ in its side walls, and the diaphragm $e$ below the openings $g$, said diaphragm having the opening $f$, and the rotary valve plate $n$ arranged below the diaphragm $e$ and in contact therewith and having the plurality of ports $o'$, $o^2$, &c. of different sizes adapted to register with the opening $f$ in the diaphragm when the plate is rotated, the perforated thimble $j$ carried by the cage below the diaphragm and rotary valve plate, and the spring $s$ between the thimble and plate acting on the plate to maintain it in contact with the lower face of the diaphragm.

11. The valve attachment for the purpose described consisting of the hollow cage $d$ having a closed top $h$, openings $g$ in its side walls, and the diaphragm $e$ below the openings $g$, said diaphragm having the opening $f$, and the rotary plate $n$ arranged below the diaphragm $e$ and in contact therewith and having the plurality of ports $o'$, $o^2$, &c. of different sizes adapted to register with the opening $f$ on the diaphragm when the plate is rotated, the post $o$ carried by the plate and extending through the diaphragm, the stud $p$ extending through the closed top of the cage having a socket receiving the post $o$, and the flange $p^2$, and the spring maintaining the flange in contact with the inner surface of the top of the cage.

In testimony of which invention, I have hereunto set my hand.

MILLARD P. OSBOURN.

Witnesses:
R. M. KELLY,
C. E. STOPPER.